United States Patent [19]

Bakeman

[11] 4,429,811

[45] Feb. 7, 1984

[54] LIQUID STORAGE CONTAINER ASSEMBLY AND DECANTER

[76] Inventor: Delbert C. Bakeman, 15520 Hamner Dr., Los Angeles, Calif. 90077

[21] Appl. No.: 337,565

[22] Filed: Jan. 7, 1982

[51] Int. Cl.³ .............................................. B05B 11/02
[52] U.S. Cl. ...................................... 222/159; 222/390
[58] Field of Search ....................... 222/386.5, 386, 390, 222/159, 95, 105, 326, 154, 159, 571, 212, 214

[56] References Cited

U.S. PATENT DOCUMENTS

| | | | |
|---|---|---|---|
| 2,772,028 | 11/1956 | Lopez | 222/95 |
| 2,788,161 | 4/1957 | Kemper | 222/571 |
| 3,231,139 | 1/1966 | Bouet | 222/95 |
| 3,288,333 | 11/1966 | Valk, Jr. | 222/95 |
| 3,353,718 | 11/1967 | McLay | 222/158 |
| 3,484,011 | 12/1969 | Greenhalgh et al. | 222/183 X |
| 3,696,969 | 10/1972 | DeVan | 222/105 |
| 3,815,787 | 6/1974 | Spies | 222/90 X |
| 4,077,544 | 3/1978 | Malacheski | 222/95 |
| 4,231,492 | 11/1980 | Rios | 222/95 X |

Primary Examiner—Stanley H. Tollberg
Attorney, Agent, or Firm—Edwin A. Oser

[57] ABSTRACT

A liquid decanter includes a collapsible container, a cylindrical outer casing enclosing the container, a piston rotatable upwards and downwards in the container and a transparent pouring neck. The piston has an outer handle and external screw threads meshing with internal screw threads on the casing. Hence the container can be collapsed and expanded, and the liquid level and hence the amount of air in the container and neck can be observed through the transparent neck. The neck has a simple screw-thread connection with a disk secured to the upper end of the casing. The neck is terminated by a valve and pouring spout. The liquid is poured into the wide opening of the disk.

4 Claims, 3 Drawing Figures

LIQUID STORAGE CONTAINER ASSEMBLY AND DECANTER

BACKGROUND OF THE INVENTION

It has been found that various liquids, particularly wine, may be spoiled when they are in contact with air. Accordingly, it would be desirable to provide a liquid decanter which permits to store the liquid by substantially excluding the presence of air, and which is so attractive that it may be used for serving at the dinner table. Furthermore, it may be desirable to maintain the liquid at either a hot or a cold temperature for an appreciable period of time.

Various patents show beverage dispensing systems and the like devices. Among these is a U.S. Pat. to DeVan, et al., No. 3,696,969. The patent recognizes the need for excluding air from partially filled wine containers, as well as thermal insulation. To this end a decorative wine cask is provided with a collapsible fluid container having a variable volume. However, the fluid container, such as a flexible polymeric bag, is collapsed simply by the action of the ambient air. The container is provided with a valve having a movable diaphragm which may be moved inwardly against the valve seat to seal the container. However, the patent does not disclose any mechanical means for forcefully reducing the volume of the flexible container.

Other patents disclose a mechanism for collapsing such a container. Among these might be mentioned the U.S. Pat. to Bouet, No. 3,231,139. A movable bottom member is collapsed by rotating a control element such as a drum upon which a thread may be wound which is connected to the container bottom. This patent specifically relates to a dispensing container for packing pharmaceutical products.

Various other mechanisms for forcibly compressing a flexible container are disclosed in the U.S. Pats. to Lopez, No. 2,772,028, and to Valk, No. 3,288,333. These patents relate, respectively, to a collapsible tube for toothpaste and a caulking gun cartridge.

SUMMARY OF THE INVENTION

In accordance with the present invention, there is provided a liquid storage container assembly and decanter which consists of a cylindrical outer casing, a collapsible container disposed therein, a mechanically rotatable piston which compresses the collapsible container, a transparent pouring neck and a valve in the neck.

Specifically, the cylindrical casing is provided with an internal coating of high reflectivity and low emissivity thermal properties, such, for example, as silver. The collapsible container is also of generally cylindrical form and consists of a flexible and stain-resistant material. The collapsible container has an upper disk which rests upon the casing and is provided with a relatively large central opening surrounded by a threaded collar. The transparent pouring neck is internally threaded to connect with the container; its valve may be a stop cock. The container is releasably secured to the casing.

Hence, it will be evident that the container can readily be cleaned and reused. The reflective coating on the inner surface of the casing, together with the layer of air between the casing, the container, the upper disk of the container and the lower piston provide means for maintaining the temperature of a liquid in the container, somewhat like a thermos bottle.

After the liquid has been poured into the collapsible container and the assembly assembled, the piston may be rotated to force the container upward until it fills the transparent pouring neck. Then the valve in the pouring neck may be closed.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
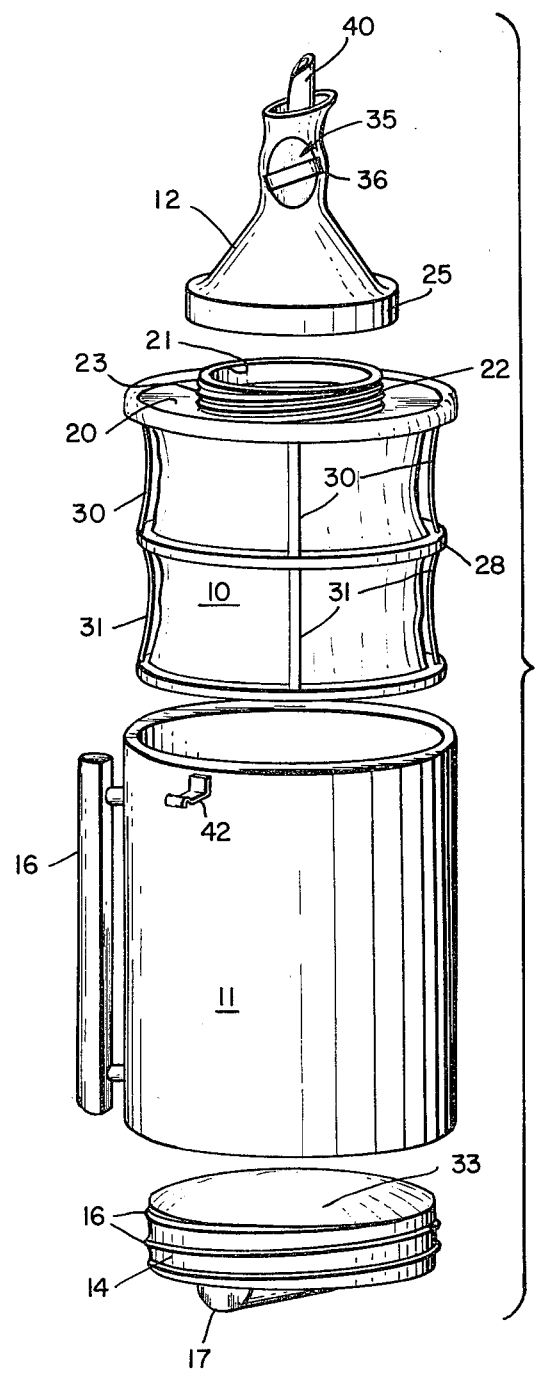
FIG. 1 is an exploded view of the container assembly of the invention.

Referring now to the drawings, there is illustrated by way of example an embodiment of the invention. As shown particularly in FIG. 1, the storage assembly includes a collapsible container 10, cylindrical casing 11, a pouring neck 12 and a rotatable piston 14.

Figure 2:
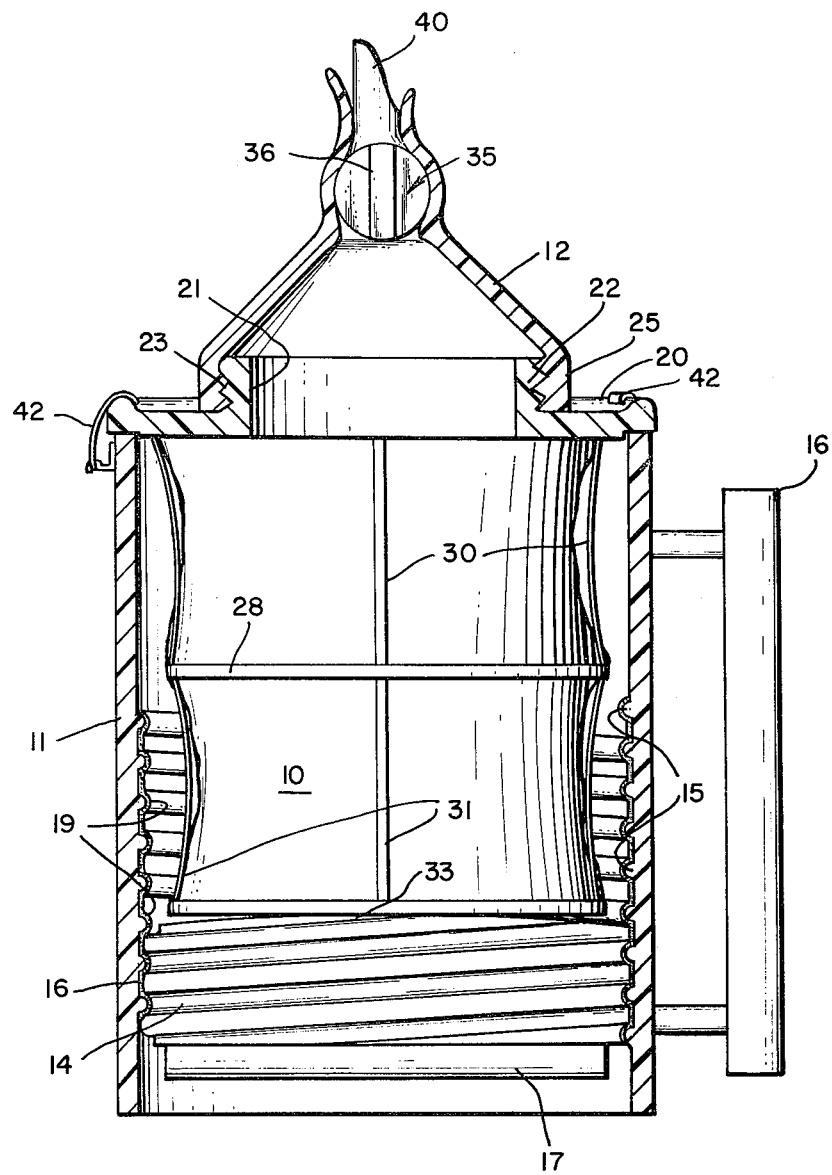
FIG. 2 is a vertical cross-sectional view on enlarged scale of the entire assembly.

As shown more clearly in FIG. 2, the casing 11 is cylindrical and provided with internal screw threads 15. The casing 11 may be provided with an internal coating 19 extending over the screw threads 15. This coating has high reflectivity and low emissivity thermal properties. The casing 11 further is provided with a suitable handle 16 for picking up the entire assembly or decanter. The piston 14 is provided with external screw threads 16 which mesh with the internal screw thread 15 of the casing 11. Finally, the piston 14 is provided with a suitable handle 17 for rotating it either up or down.

The container 10 preferably is collapsible and of generally cylindrical form, so as to be enclosed by the casing 11. The container 10 consists of a flexible and stain-resistant material for holding a liquid. It is secured to an upper disk 20 having a large central opening 21 surrounded by an upstanding neck 22 having an external screw thread 23. The pouring neck 12 is of generally conical shape and has a lower cylindrical portion 25 provided with an internal screw thread 26. Alternatively, the neck 12 may be secured to the container 10 by releasable clamps.

It should be noted that the collapsible container 10 may be provided with a central ring 28 to which are secured stays 30 and 31, connected respectively between the ring 28 and the disk 20, or the ring 28 and the bottom of the container. The stays 30, 31 are relatively stiff, but flexible and spring-like. They serve the purpose of aiding the container 10 to return to its cylindrical shape after the piston 14 is rotated downwardly.

Preferably, but not necessarily, the piston may be upwardly slightly rounded to provide a bulge 33 to minimize the area of contact between the piston 14 and the container 10, and hence the friction.

Figure 3:
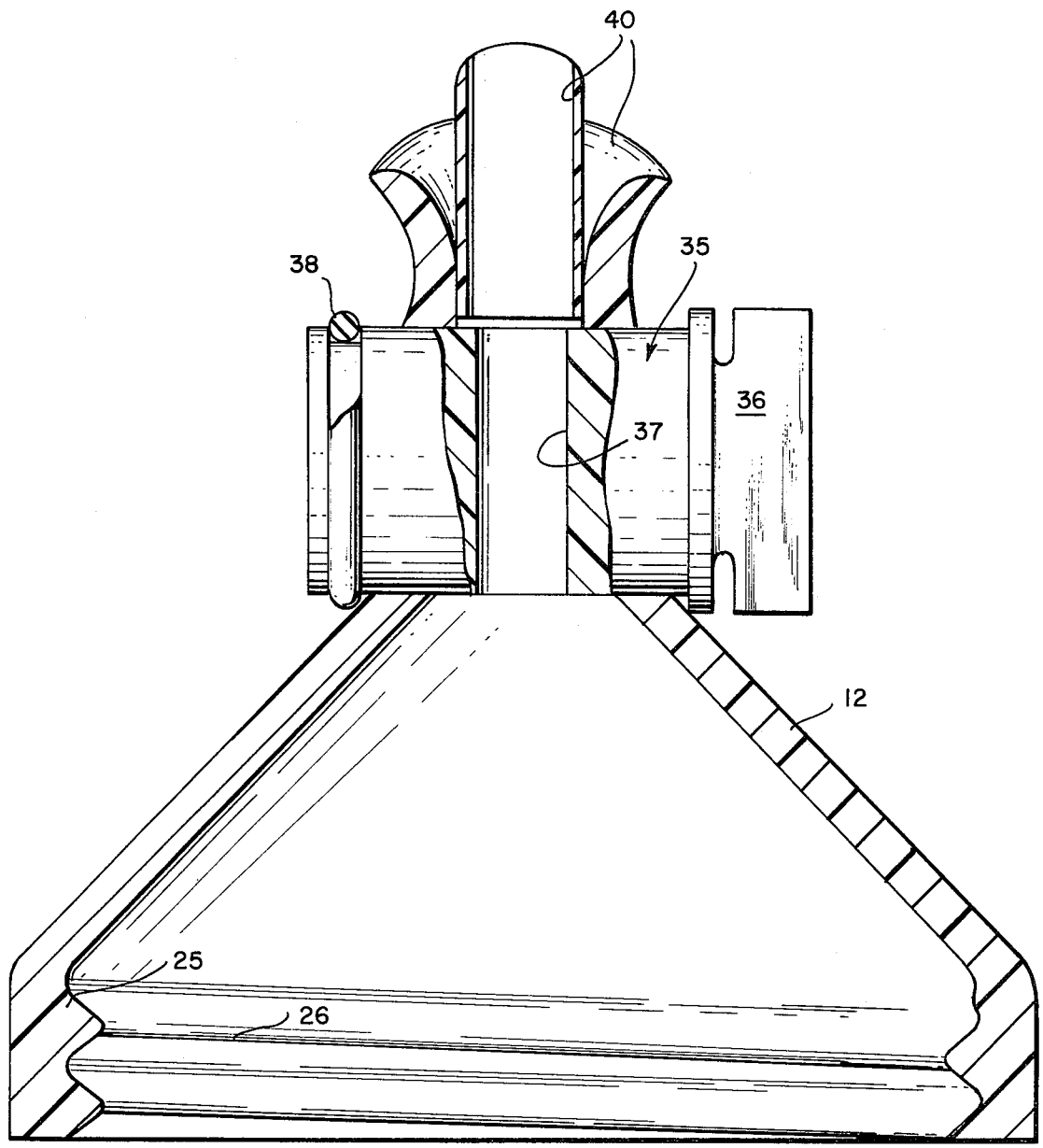
FIG. 3 is a vertical cross-sectional view taken at right angles to that of FIG. 2 and on enlarged scale, of the pouring neck, valve, and pouring spout.

The pouring neck 12 may be provided with a valve 35 such as a stop cock, shown particularly in FIG. 3. The stop cock has a handle 36 and a central, cylindrical opening 37. It extends through the pouring neck 12 and is provided with a retainer ring 38 to prevent the stop cock from slipping out toward the right of FIG. 3. The pouring neck 12 ends in a pouring spout 40 which is preferably of the dropless type.

The container 10 may be releasably retained by the casing 11 by means of clips 42 which may be lifted over the outer edge of the disk 20 when the device is assembled (see FIG. 2).

The container 10 may, for example, consist of polypropylene. The casing 11, as well as the piston 14 and the handles 36 may, for example, consist of hard plastic which may be an acrylic type plastic obtainable in the trade by the name Plexiglas. The spout 40 and the stop cock 35 may also consist of a clear acrylic type plastic.

It should be noted that the stays 30 and 31 are flexible but substantially stiffer than the plastic of the container 10. Hence, the stays 30, 31 help the container 10 to regain its original cylindrical shape when the piston 14 is lowered.

The liquid, such as wine, may simply be poured into the large opening 21 defined by the collar 22. Thereupon the pouring neck 12 may be screwed into the container and the piston 14 may be rotated upwards until the liquid level reaches the upper portion of the pouring neck 12. At that time the stop cock may be rotated through 90°, thereby to preserve the liquid and seal it.

The temperature of the liquid in the container 10 may be substantially maintained by the heat-reflecting properties of the coating 19, which may, for example, consist of silver. This action is helped by the small air space defined between the casing 11, the container 10, the piston 14 and the disk 20. In some cases it may be desirable to also provide the container 10 with such a heat-reflecting coating.

Thus, the liquid storage container assembly and decanter will store and preserve the liquid while substantially excluding the air. It will substantially maintain the temperature at least for an appreciable period of time, and it may be made to look attractive, so it can be used at the dining table. What is claimed is:

1. A liquid storage container assembly and decanter comprising:
   (a) a collpsible container of generally cylindrical form and consisting of a flexible and stain-resistant material for holding a liquid;
   (b) a cylindrical outer casing for enclosing said container, said casing having an internal screw thread and having an internal coating of high reflectivity and low emissivity thermal properties;
   (c) a piston having an outer screw thread meshing with said internal screw thread, whereby said coating and the air space between said container, casing, and piston tend to maintain the temperature of a liquid in said container, said piston having a handle for rotating it to compress or release said container, thereby to substantially exclude air from said container;
   (d) a transparent pouring neck having means for removably attaching it to said container;
   (e) a valve disposed in said pouring neck for opening and closing the space within said container;
   (f) said pouring neck having a pouring spout; and
   (g) said container being provided on its outside with relatively stiff, spring-like and deformable stays extending between said disk and the lower edge of said container, thereby to tend to restore said container to its uncompressed state when said piston is moved downwardly.

2. A decanter as defined in claim 1 wherein a ring is disposed about the circumference of the outside and about midway of said container, said stays being secured at one end to said ring.

3. A liquid storage container assembly and decanter comprising:
   (a) a collapsible container of generally cylindrical form and consisting of a flexible and stain-resistant material for holding a liquid;
   (b) a cylindrical outer casing for enclosing said container, said casing having an internal screw thread;
   (c) a piston disposed in said casing, having an outer screw thread meshing with said internal screw thread on said casing, said piston having a handle on its lower surface for manually rotating it either upwards or downwards to compress or release said container, thereby to substantially exclude air from said container;
   (d) a transparent pouring neck of substantially conical shape;
   (e) a valve disposed in said pouring neck for opening and closing the space within said container and for allowing egress of the liquid therein; and
   (f) said pouring neck hving pouring spout whereby the level of the liquid in said container and said pouring spout can be observed through said transparent pouring neck to ascertain that the air has been substantially expelled from said container and neck.

4. A decanter as defined in claim 3 wherein said pouring neck is provided with internal screw threads on its lower surface, and wherein a disk is provided, said disk being secured to the upper edge of said container and having a central opening substantially as wide as the internal opening of the lower portion of said neck for filling said decanter with a liquid, a collar on said disk surrounding said opening and having an external thread to mesh with the internal thread on said pouring neck, thereby to facilitate assembly, disassembly and cleaning of said decanter.

* * * * *